May 24, 1966 J. HUREAU 3,252,181
APPARATUS FOR THE PRODUCTION OF PROFILED PIECES
SHOWING A LACUNAR OR RETICULATED STRUCTURE
Filed Dec. 18, 1961 8 Sheets-Sheet 3

United States Patent Office 3,252,181
Patented May 24, 1966

3,252,181
APPARATUS FOR THE PRODUCTION OF PRO-
FILED PIECES SHOWING A LACUNAR OR RE-
TICULATED STRUCTURE
Jacques Hureau, Paris, France, assignor, by mesne assign-
ments, to Societe Generale Alimentaire
Filed Dec. 18, 1961, Ser. No. 159,965
Claims priority, application France, Dec. 28, 1960,
848,186; July 7, 1961, 867,302; July 10, 1961,
867,509
10 Claims. (Cl. 18—12)

The present invention concerns a machine for continu-
ous production of profiled pieces such as sheets, plates,
tubes etc., having a structure which is lacunar or more
particularly reticulated (grid, trellis, net, cloth, etc.), and
in particular made of a synthetic material.

A process and a machine are already known for con-
tinuous production of sheets of tubes or reticulated struc-
ture. The known process and machine rely on continu-
ous extrusion of the material through two sets of dies
which are displaced with respect to one another in a trans-
verse direction in relation to the sense of extrusion. The
two sets of dies produce simultaneously two independent
and juxtaposed sheets of extruded threads. The threads
of one sheet are secured locally by spontaneous bonding
to those of the other at each coincidence of the dies of
one set with those of the other, so as to form the "knots"
of the network. Thus the known apparatus can never
provide uniform thickness, since the "knots" have a thick-
ness a little less than double the thickness of each extrud-
ed thread which has disadvantages for certain applications,
for example fishing nets. Furthermore, the use of two
sets of dies is very expensive.

The present invention makes possible production, under
much more economical conditions, of sheets, plates or
tubes of reticulated structure or lacunar structure which
has the advantage of having a uniform thickness, includ-
ing uniformity at the points where the bands, strips strands
or threads forming the network cross. There is no thick-
ening at the "knots" of the network. The invention pro-
vides a reduction of cost of networks made according to
the invention, arising primarily from the use of simpler
means and method of production.

The present invention makes possible very economical
manufacture of profiled pieces, of whatever section, hav-
ing a lacunar structure.

The machine according to the invention is characterised
by the fact that it comprises at least one extrusion die
for extruding material to the desired profile, means for
preventing at least temporarily the material from leaving
the die at those parts corresponding to the desired voids,
and for solidifying it upon leaving the die.

Extruders according to the invention are made, for
example, with one or more combs having a plurality of
teeth mounted immediately adjacent an extrusion orifice
in an extrusion die of the extruder. In extruders having
one comb the comb is displaced relative to the die between
two operative positions; one position in which its teeth
partially obstruct the die orifice and another position in
which the teeth of the comb are clear relative to the ex-
trusion orifice. Means are provided alternately displac-
ing the comb between its two operative positions.

In extruders having a system of two combs the combs
are displaced transversely of an elongated extrusion die
orifice to operative positions and partially obstruct the
orifice at spaced areas along the length of the elongated
orifice at spaced areas along the length of the orifice of
the die. The combs coact to uncover the orifice so that
it is unobstructed along its full length. This is accom-
plished by disposing identical combs with the ends of the
teeth of one comb opposite the ends of the teeth of the
other comb.

The teeth ends are mutually spaced a distance equal to
at least the width of the extrusion orifice. As the combs
are displaced transversely of the orifice between two op-
erative positions, they move through an intermediate posi-
tion in which the space between the ends of the teeth
renders the orifice completely unobstructed. The means
for actuating or displacing the combs can be constructed
to displace the combs between the two operative positions
and dwell at the intermediate position.

The extruders using one or more combs are thus able
to manufacture sheets of reticulated structure formed by
continuous, parallel threads or strands formed when areas
of the orifice or path of extrusion are obstructed. When
the orifice is unobstructed, the apparatus extrudes a strand
which is a continuation of the parallel strands and sub-
stantially normal to the parallel strands to form square
or rectangular meshes in the extruded sheet of soldifiable
material.

The invention provides for extrusion of tubular reticu-
lated structures. An extruder for extruding these tubular
structures comprises extrusion die means comprising co-
axial, orifice-defining means having coaxial, coactive sur-
faces jointly defining in a first operative position a discon-
tinuous extrusion orifice having obstructed areas and
spaced, unobstructed areas contiguous with the obstructed
areas for extruding a plurality of elongated generally par-
allel strands. The coactive surfaces of the die means are
axially movable relatively one to the other to a second
operative position, the coactive surfaces spaced and joint-
ly defining the extrusion orifice as a continuous and un-
obstructed orifice for extruding therethrough strands as
continuations of the first mentioned strands but substan-
tially normal to the first mentioned strands.

By way of example, there is described below and shown
schematically in the attached drawing several embodiments
of the invention.

In the various figures there have only been shown the parts necessary to understanding the principles of the invention, the parts not shown are known and their combination with those shown present no particular technical difficulty. It will be understood that the terms threads and strands are interchangeable as hereinafter employed.

Figure 1:
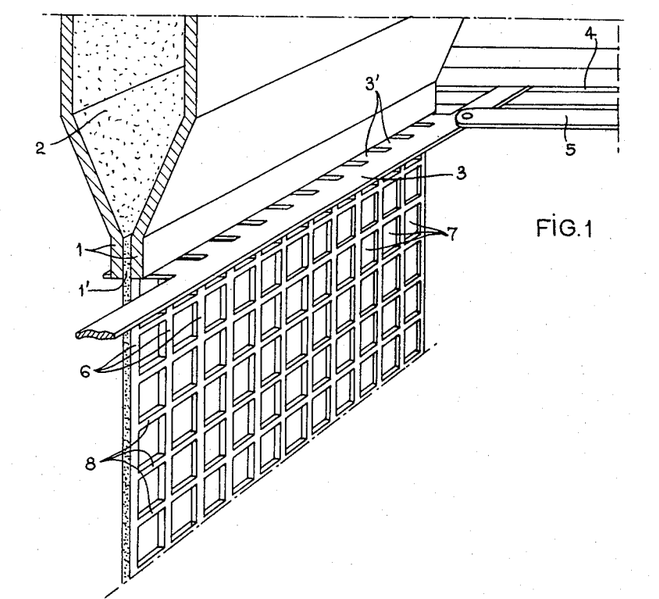
FIGURES 1 and 2 are respectively two vertical views
illustrating diagrammatically two different phases of op-
eration of a machine for continuous production of plates
or sheets or reticulated structure of rectangular or square
mesh.
Figure 2:
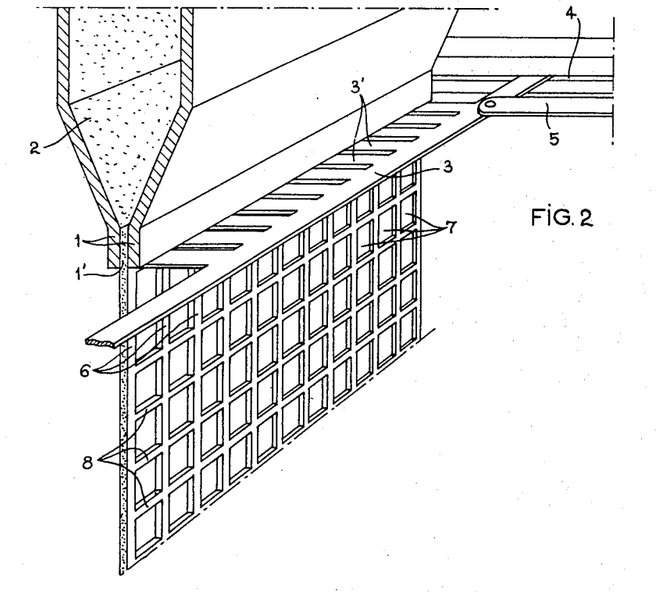

The embodiment schematically shown in FIGURES 1 and 2 comprises essentially a machine for extruding synthetic material in sheet form. There is shown a flat die 1 with which machines of this kind are provided and to which the material is delivered in a physical state suitable for extrusion. Below an outlet 1' of the flat die 1, and close to it, is located, in a horizontal plane, that is to say perpendicular to the direction of flow of the material out of the die 1, a comb 3 having regular teeth 3', of straight form in the example shown. This comb 3 is parallel to the extrusion orifice or outlet 1' of the flat die 1, so that its teeth 3' are perpendicular to the material leaving the die 1 as a sheet. The comb 3 is mounted so that it can slide perpendicularly to the die 1. By means of the guide members 4 at its ends, positive control members such as the coupling rod 5 effect sliding movement of the comb 3 between a first operative position, where its teeth partially obstruct the orifice or outlet 1' of the flat die 1 (FIGURE 1), and a second operative position in which its teeth 3' are clear of the orifice or outlet 1' (FIGURE 2). Means, not shown but known, are provided to actuate the positive control members such as 5 so as to make the comb 3 move alternately from one to the other of its two operative positions defined above. These known means can comprise, for example, cams, systems of cranks, etc., operated by an appropriate power source.

When the comb 3 is in its first operative position shown in FIGURE 1, the material leaves the flat die 1 not in the form of a continuous sheet but in the form of linear elements or strands 6 which are vertical, in the example shown, and which pass through the spaces between the teeth 3' of comb 3. Each of the teeth 3' prevents flow of material along its entire width, resulting in the formation of meshes or spaces 7 separating the linear elements 6.

When the comb 3 occupies its second position shown in FIGURE 2, the outlet 1' of the die 1 is thereby entirely free, the material flows uniformly over the entire length of the die, thereby forming one of the linear elements 8, which are horizontal in the example shown. It can be seen that the crossing of the vertical linear elements 6 and the horizontal elements 8 gives the sheet leaving the die 1, a reticulated structure with rectangular or square mesh, which is brought to the solid state upon formation, that is below comb 3, by appropriate known means, not shown, adapted to the nature of the extrudable material used. The width of the linear vertical elements 6 is close to the size of each of the spaces between the teeth 3', while the size of the meshes 7 correspond substantially to the size of the teeth 3'. The width of the horizontal linear elements 8 and the height of the meshes 7 depend on the other hand, in part on the speed of extrusion of the material through the die 1 and in part on the time intervals during which the outlet 1' of the flat die 1 is, respectively, wholly freed or partially obstructed by the teeth 3' of the comb 3. Within the degree to which the speed of extrusion of the sheet can be maintained constant, the relation between the successive time intervals during which the teeth of the comb 3 partially obstruct the outlet 1' of the flat die and those during which the teeth 3' are withdrawn is selected preferably equal to the relation between the height of meshes 7 and the width of the linear horizontal elements or strands 8 of the network to be produced. According to the width given to the linear elements 6 and 8 and the degree of flexibility that they keep after solidification of the extruded material, these linear elements are analogous to bars, the resulting network being then a grid or a trellis or to threads, the network obtained then exhibiting the flexibility of cloth, from which it differs primarily in that it is formed by one piece, produced without welding or gluing. It is to be noted that the network the production of which has just been described, exhibits at each point of crossing of its linear elements 6 and 8, a thickness equal to that of the linear elements. This characteristic distinguishes it from networks which are produced in known fashion, of such kind that their points of crossing are formed by the cooperation of at least two independent linear elements, and in which the thickness of the points of crossing is generally slightly less than double that of each of the constituent linear elements.

A network of close mesh can be made in the manner just described from any extrudable material notably:

(1) Synthetic materials, particularly thermoplastic and thermosetting, as well as natural and synthetic rubbers. In the first case, the thermoplastic material is heated in the extrusion machine to its softening temperature, then it is cooled suddenly beneath the comb 3, for example or by immersion in a liquid, by the action of a current of cold air, etc. The flat die 1 of the machine as well as the comb 3 are then brought preferably to the temperature of extrusion, by known means, that need no description. The comb 3 is then made preferably of a metal which is a good heat conductor.

(2) Materials extrudable in a moist state, such as viscose, which can be extruded cold, their hardening below comb 3 being effected by immersion in, or by spray of an appropriate product.

(3) Glass.

(4) Metals and their alloys in pasty or molten state; the flat die 1 can be replaced in this case by a train of rolls.

Figure 3:
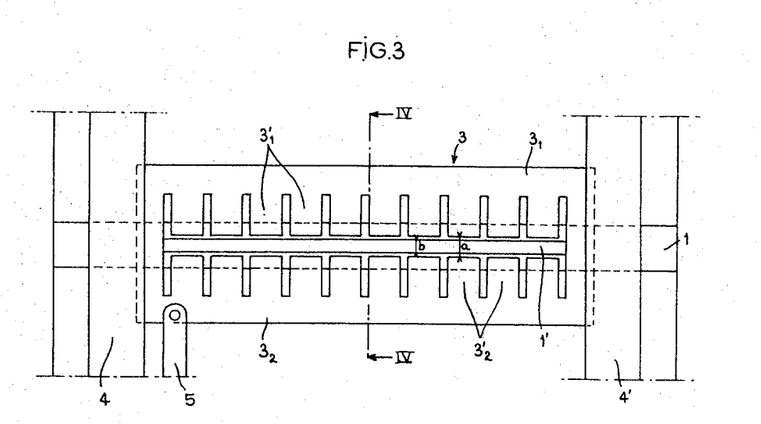
FIGURES 3 and 4 are respectively a view from below
and a section view taken on the line IV—IV of FIG-
URE 3, of a variation of the machine of FIGURES 1
and 2.
Figure 4:
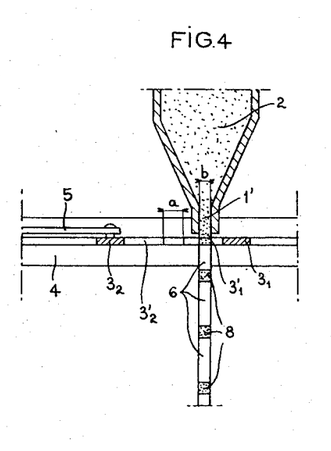

The variant shown schematically in FIGURES 3 and 4 is provided with a double comb 3, which is formed by two combs $3_1$ and $3_2$, identical with one another as well as with the single comb of the embodiment of FIGURES 1 and 2; the two identical combs $3_1$ and $3_2$ are rigidly assembled to each other so that the extremities of all the teeth of one are at the same distance $a$ in relation to the extremities of the teeth of the other. This distance $a$ is at least equal to the width $b$ of the flat die. In the example shown, the two combs $3_1$ and $3_2$ are made by working a single metal plate 3. The comb system 3 can slide perpendicularly to the flat die 1 in guides 4, 4', between the following two extreme operative positions; a first operative position in which the teeth $3'_1$ of the comb $3_1$ partially obstruct the outlet 1' of the die 1, as shown in FIGURE 4 in transverse section on a plane passing through two consecutive teeth of the comb; a second extreme operative position, symmetrical with the former in relation to the longitudinal plane of symmetry of the flat die 1, and in which the teeth $3'_2$ of the comb $3_2$ partially obstruct the extrusion orifice or outlet 1' of the flat die 1. Between these two extreme positions, the comb system 3 pass through an intermediate position, shown in FIGURE 3, in which the longitudinal planes of symmetry of the system of combs 3 and of the flat die 1 coincide. The outlet 1' of the flat die is then completely clear, since its width $b$ is at most equal to the space $a$ between the corresponding teeth of the two combs $3_1$, $3_2$. Known means, acting on the positive control member 5 periodically pass the comb system 3 from one of its two extreme positions to the other, passing through the intermediate position. The principle of forming the network by means of the double comb 3 is the same as that for forming it by means of the single comb 3 of FIGURES 1 and 2. The teeth of each of the two comb halves $3_1$ and $3_2$ of the double comb work simply in alternate fashion to form the mesh of the network.

Figures 5, 6:
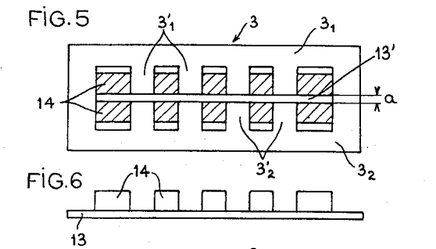
FIGURES 5 to 8 are diagrammatic views illustrating
an improvement of the machine shown schematically in
FIGURES 3 and 4.
Figure 7:
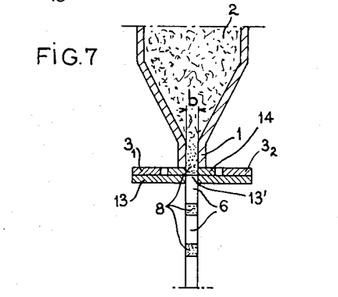
Figure 8:
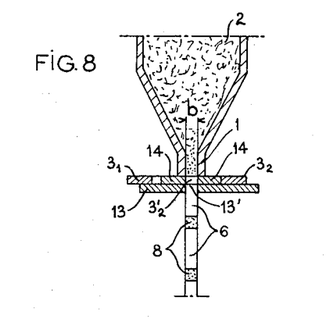

The arrangement which has been described with reference to FIGURES 3 and 4 has the following disadvantage: when the teeth $3'_1$, $3'_2$ of the double comb 3 are completely clear of the extrusion orifice or outlet of the flat die 1, the material leaving this outlet passes not only the spaces between the pairs of opposed teeth of the two combs $3_1$ and $3_2$, but it also tends to pass the spaces existing between the teeth of a comb. The result is principally that the sheet of lacunar structure which is obtained by this arrangement exhibits excess thicknesses at the level of the crossing points of its linear elements 6 and 8. To overcome this disadvantage the variation shown in FIGURES 5 to 8 includes a plate 13, shown in elevation in FIGURE 6, which has a medial slot 13' of length and width equal at least to those of the outlet of the die and of which one face supports pieces for insertion between the teeth of the comb system. In the example illustrated, these pieces have the form of parallelopipeds 14. They each have a length corresponding to the space between two teeth of the comb 3 between which they have to be inserted respectively, and a thickness less than the depth of the tooth space. This can be seen particularly in FIGURE 5 which is a view from above of the plate 13 and of the double comb 3 placed on it so that the pieces 14 are inserted between the teeth $3'_1$, $3'_2$. In FIGURE 7 the pieces 14 can be seen obstructing the spaces between the teeth of the two combs $3_1$, $3_2$ when these are clear of the outlet of the die 1, so as to prevent the material passing through these spaces. Since the plate 13 and the pieces 14 which it supports are fixed relative to the die, these latter pieces never obstruct the outlet from the die. Furthermore they do not interfere with the displacement of the double comb 3 relative to the die as can be seen from FIGURE 8. By way of variation, it is equally possible to omit the pieces 14 and to keep only plate 13, provided with its medial slot 13', of a width at least equal to the width $b$ of the outlet of the die 1, the plate 13 being applied simply against the face of the double comb 3 opposed to the outlet of the die 1.

Figure 9:
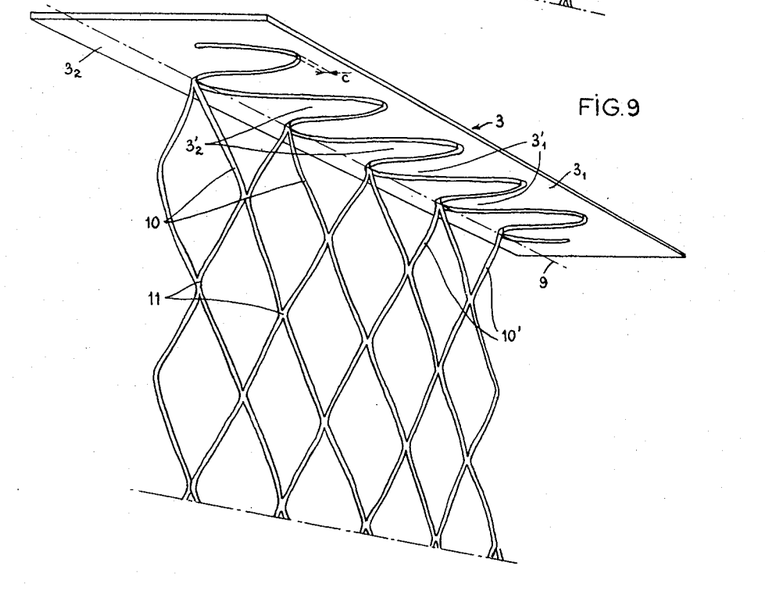
FIGURES 9 and 10 are vertical schematic views illus-
trating schematically two different phases of the operation
of a machine for continuous production of sheets of
reticulated structures of oval mesh.
Figure 10:
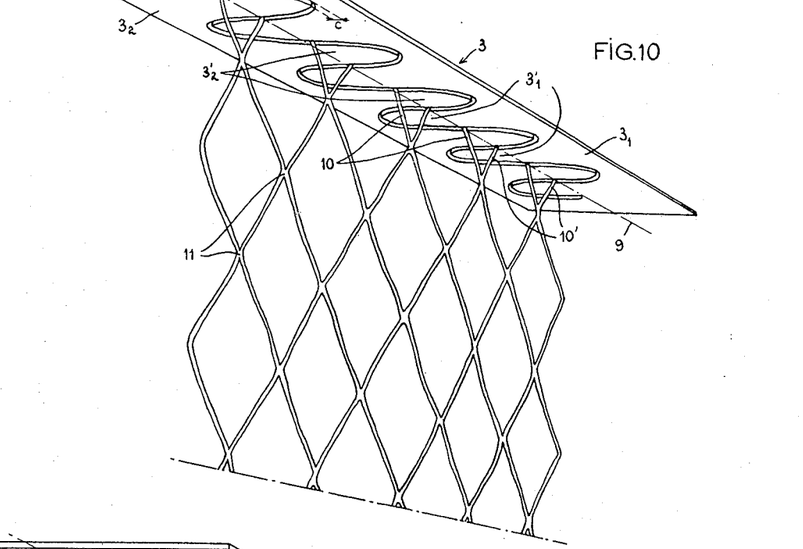

The machine for making a sheet of reticulated structure having lozenge-shaped meshes which is illustrated very schematically in FIGURES 9 and 10 (on which for reasons of clarity the sheet extrusion die has not been shown), is also equipped with a double comb 3, formed of two identical combs $3_1$, $3_2$, which are rigidly secured to one another so that the ends of all the teeth of one lie between the teeth of the other, at a constant distance from the roots of these teeth. It can be seen in the drawings that the extremities of the teeth $3'_2$ of the comb $3_2$ all lie at the same distance $c$ from the bases of the spaces between the consecutive teeth $3'_1$ of the comb $3_1$. The distance $c$ is chosen at least equal to the width of the outlet or orifice of the die ($b$ in FIGURES 3 and 4). In the example shown the two combs $3_1$, $3_2$ are formed by working a single metal plate 3 which is mounted so as to be able to slide perpendicularly to the flat die, not shown, between two extreme positions, symmetrical with respect to the longitudinal plane of symmetry of the flat die, and of which one is shown in FIGURE 9. Each of these two extreme operative positions of the comb system 3 is such that the roots of the teeth of the comb $3_1$ or of the comb $3_2$ are located in relation to the extrusion orifice or outlet of the flat die (1' in FIGURES 3 and 4), so that the outlet is partially obstructed only by the roots of the teeth of the other comb $3_2$ or $3_1$. Between these two extreme positions the comb system 3 passes intermediate positions, in which the extrusion outlet or orifice of the flat die is partially obstructed at the same time by the teeth $3'_1$ of the comb $3_1$ and by the teeth $3'_2$ of the comb $3_2$. In that intermediate position which corresponds to FIGURE 10, the material can flow from the die (of which the position on the drawinb of comb system 3 has been shown by the chain-line 9), only to either side of each of the teeth of the two combs $3_1$, $3_2$: there is therefore formation of threads 10, 10', which constitute the sides of the lozenge meshes. In each of the extreme positions of the comb system 3 (FIGURE 9), the material can on the contrary only leave the die at the spaces existing between each of the teeth of one of the combs and the base of the corresponding tooth space of the other comb. There is also formation of thread elements 11 which number half of the thread elements 10 formed simultaneously in the intermediate positions, and, from the fact of the continuity of the process, these thread elements 11 constitute points of crossing of the thread elements 10, from which results the structure having lozenge meshes which is illustrated. This corresponds to the case where the thread elements 11 are much shorter than the thread elements 10, that is to say to a case where the comb system 3 stays in one and the other of its two extreme positions during intervals of time much less than those needed for passage from one to the other of the extreme positions. By causing the comb system 3 to dwell in one and the other of the two operative positions during longer intervals of time, it is possible to obtain thread elements 11 whose length approaches that of the thread elements 10, the network obtained then has hexagonal meshes. It is to be emphasized that the thread elements 11 which constitute the points of cross over of the lozenge network of FIGURES 9 and 10 are single threads, and do not result from the juxtaposition and spontaneous adhesion of two threads, as in the known process previously mentioned. It is particularly evident in the case of a hexagonal network according to the invention, where each of the thread elements 11 constitutes one of the sides of a hexagonal mesh, and exhibits exactly the same thickness as the elements 10 forming the other sides of the mesh. In giving the teeth of the combs $3_1$ and $3_2$, principally at their ends, which are preferably pointed, as well as at the bases of their spaces, which are preferably rounded, appropriate forms and dimensions, one can give the thread elements 10 and 11 identical or different transverse sections; it is then possible thus to give the elements 11 forming the points of cross-over, a section less than that of the elements 10 forming the sides of the lozenge mesh, which is impossible with the known process mentioned earlier.

Figure 11:
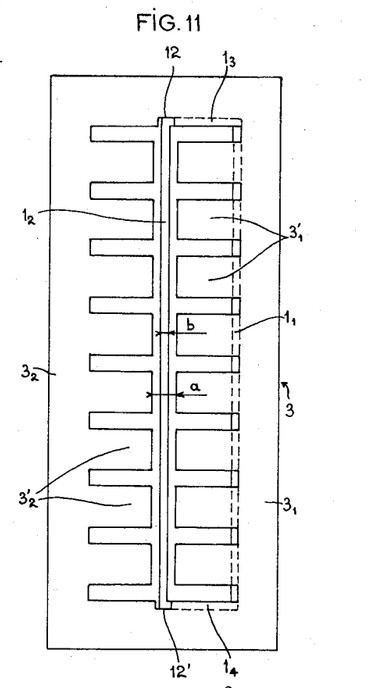
FIGURE 11 is a view from below of a machine for
continuous production of tubes of reticulated structure
of rectangular or square mesh.

The machine for making a tube of reticulated structure having rectangular or square meshes, which is shown schematically from below in FIGURE 11 comprises a die of elongated rectangular form, the outlet of which has the same size $b$ on all four sides and below this die, and immediately beside it, a comb system 3, formed by two combs $3_1$, $3_2$, preferably identical to one another and coupled rigidly to one another so that the extremities of the teeth $3'_1$ of the comb $3_1$ are separated from those of the teeth $3'_2$ of the comb $3_2$ by a space $a$ at least equal to the size $b$ of the outlet of the die 1. In the example illustrated, the two combs $3_1$ and $3_2$ are produced by working a single metal plate 3 which is mounted to slide perpendicularly to the two major sides $1_1$, $1_2$ of the outlet of the rectangular die by means of guide members, not shown. This sliding takes place in a plane parallel and practically touching the outlet of the rectangular die, between two extreme positions, of which one is shown at FIGURE 11, and which are symmetrical with respect to the plane of symmetry of the die of elongated rectangular form. In each of these two extreme positions the teeth of one of the two combs (those $3'_1$ of $3_1$ in FIGURE 11) partially obstruct the outlet of one of the large sides of the die ($1_1$ in FIGURE 11), while the outlet of the other large side of the die ($1_2$ in FIGURE 11) is completely clear. In each of the two extreme positions of the comb system 3, one of the large sides of the die ($1_1$) forms linear vertical elements (such as 6 in FIGURE 1), while the other large side ($1_2$) simultaneously forms a single linear horizontal element (such as 8 in FIGURE 1). The recesses 12, 12' provided in the comb system 3 at the level of the space $a$ between the extremities of its two sets of teeth $3'_1$, $3'_2$ so as to clear continually variable zones of the two small sides $1_3$, $1_4$ of the die, ensure respectively the continuous formation of a linear element joining the two halves of the network which are made respectively by the teeth of the two combs $3_1$, $3_2$.

The tubular network of rectangular section thus obtained can be deformed, even before solidification, for example by the use of a gauge so as to form a tubular network of whatever section, even circular.

Several tubular networks can be made simultaneously by means of a single rectangular die, with which several double combs are associated, juxtaposed one with another.

The process and the machine according to invention allows production of sheets and tubes of reticulated structure having meshes of very different types, not only rectangular, square, lozenge or hexagonal as previously described, but also of much more complex forms. The same process also enables the manufacture of sheets and tubes of lacunar structure, exhibiting for example designs analogous to these of embroidery.

By feeding the die simultaneously with differently colored materials, it is possible to obtain sheets and tubes having multicolored parallel bands.

The comb system associated, according to the invention, with the die of the sheet extrusion machine, must be adapted to the type of mesh of the network to be produced, as well as the movements which have to be given to this comb system. The expression "comb system" includes not only one or several combs coupled rigidly together, as previously described but it equally includes, within the scope of the present invention, several combs, even of different structure, and capable of independent movement with respect to the outlet of the die, with a view particularly to the production of networks of complex structure.

FIGURES 12, 13, 29 and 30 show a machine according to the invention for extruding material in a tubular configuration. The figures are limited to the parts by which the extruder of the invention is distinguished from known machines or extruders of the same kind. It comprises a fixed die 21 having the form of a solid of revolution about the axis 22. Its lower part includes a machined annular conical surface 23, diverging towards the base. An annular piece 24 fastened to the die 21, particularly at 24', defines with the machined surface 23 an annular extrusion channel 25, which extends in the axial direction, and the upper annular inlet of which is fed by a distribution chamber 26 also annular, which, in the example shown, is formed by a throat provided in the die 21 above the machined surface 23. The throat is closed at its periphery by the annular piece 24. The material to be extruded is brought, in a convenient physical state, through the upper extremity of a channel 27, coupled axially in the part of the die 21 situated above the distribution chamber 26. Radial channels 28 communicate between the axial channel 27 and the chamber 26 to carry to it the material to be extruded. A second mobile die 29 is formed by a ring mounted coaxial with and about the lower extremity of the fixed die 21, above the lower edge of the machined surface 23, so as to be slidable freely about the ring 24, coupled to the die 21. In the illustrated example, the movable die 29 is fast with a ring 29' to which it is fixed for example by bolts 30, and which can slide about the medial and upper parts of the fixed die 21, equally in the direction of the axis 22. The lower extremity of the movable die 29 has a machined annular surface 23', by which the die 29 can come into a sealing contact with the machined surface 23 of the fixed die 21, or at least with its lower edge. In the machined surface 23' of the die 29 are disposed radial grooves 31, or channels of open section on the machined surface. A heating sleeve 46 formed for example by an electric resistance winding, is located around the movable die 29 and the ring 29' with which it is fast, so as to bring that die, and, by thermal conduction the fixed die 21, to a temperature close to the extrusion temperature of the material in question where this is higher than ambient temperature. The machine comprises other means for periodically passing the movable die 29 and the fixed ring 29', with which it is fast, by sliding about the fixed die 21, in the axial direction 22, from a position in which the machined surface 23' of the die 29 is in contact with the corresponding machined surface 23 of the die 21, to another position, above the former in the example illustrated, and in which the machined surfaces 23 and 23' of the two dies 21 and 29 are sufficiently spaced to totally clear the outlet of the annular channel 25.

Figures 12, 13, 29, 29A, 30, 30A:
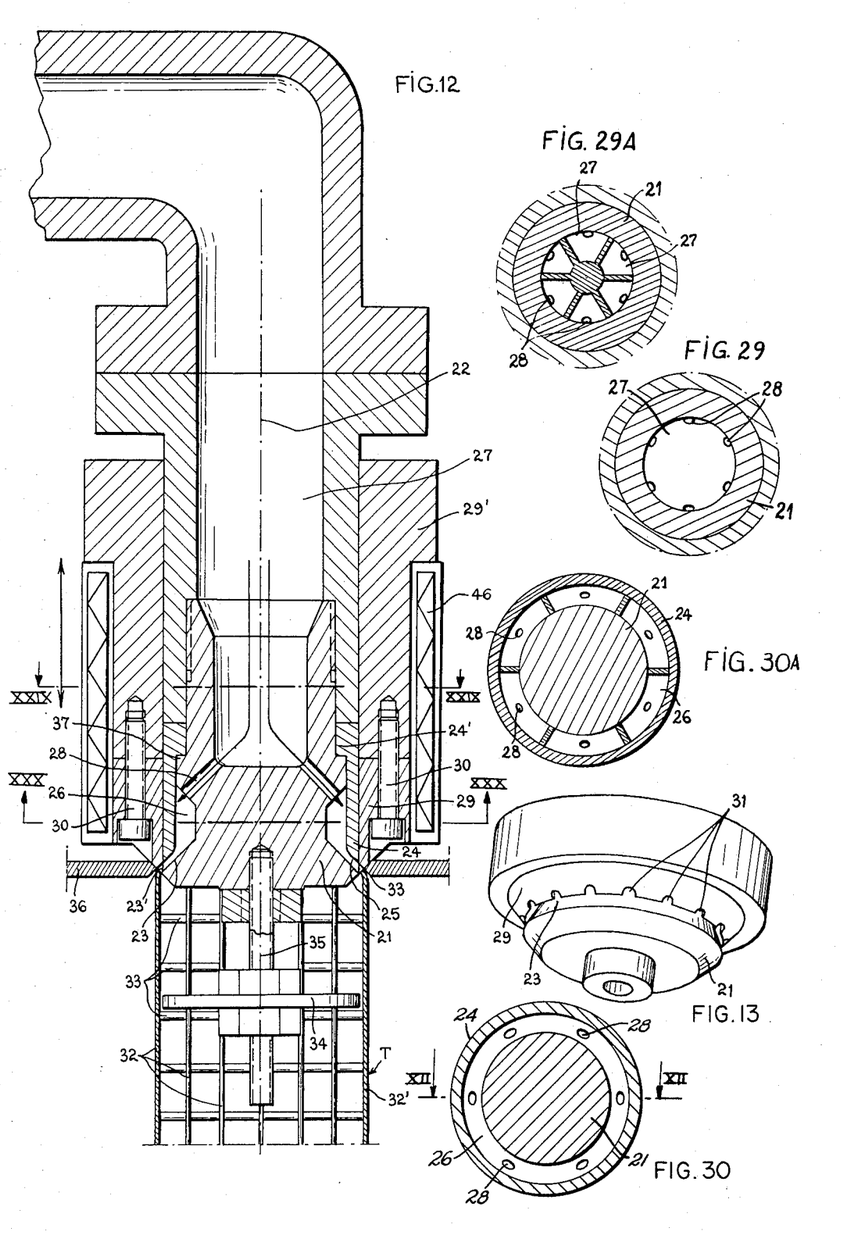
FIGURE 12 is a view in section through a diametric
plane, at section line XII of FIG. 30 of an embodiment
comprising a fixed cylindrical die, about which concen-
tric annular die can slide axially.
FIGURE 13 is a view from below in perspective of the
two dies of the machine shown in FIGURE 12.
FIGURE 29 is a cross section view taken on section line XXIX of FIGURE 12.
FIGURE 29A is a cross section view of a variant of the embodiment in FIGURE 29.
FIGURE 30, is a cross section view taken along section line XXX—XXX of FIG. 12.
FIGURE 30A is a cross section of a variant of the embodiment in FIG. 12 and illustrates a cross section taken at a plane corresponding to the view of FIG. 30.

The production of a tube having rectangular meshes by means of the extrusion machine which has just been described takes place as follows; each time that the two dies 21 and 29 are in contact with one another by way of their machined surfaces 23, 23', so that the orifice or outlet of the annular channel 25 is discontinuous and is locally obstructed by the intervals or areas between the transverse channels 31 of the die 29, which constitute unobstructed areas contiguous with the obstructed areas. The materal brought through the distribution chamber 26 is extruded exclusively by way of the unobstructed areas defined by the transverse channels 31, forming linear elements such as bars, strips, threads or strands etc., according to the dimensions of the setcions of these linear elements, and by virtue of the sections of the transverse channels 31. Under the effect of weight, these different linear elements leaving the transverse channels 25 form a sheet of longitudinal parallel elements 32, 32', exhibiting a closed section. Each time on the contrary that the machined surfaces 23, 23' of the dies 21 and 29 are sufficiently spaced axially from one another, by the raising of the die 29, so that the outlet or orifice of the annular channel 25 is totally clear or unobstructed the material is extruded through the channel 25 in the form of an annular element 33, transverse with respect to the linear parallel elements 32, 32'; this transverse straight element 33 couples to the longitudinal linear elements 32, 32' at the points of crossing, that is to say in the annular channel 25, or at least in the neighborhood of the outlet. Due to the periodic formation of a transverse linear element such as 33 a tube T having rectangular meshes is obtained, from the fact that its meshes are defined by the longitudinal elements 32, 32' and by the transverse elements 33. The tube exhibits a remarkable dimensional stability in its longitudinal and transverse directions.

The extruded tube T is immediately received below the outlet of the annular channel 25, by a gauge disc 34, which is fixed for example by a screw 35 to the lower extremity of the die 21. By giving the gauge 35 a form and/or dimensions different from those of the section of the tube T upon leaving the annular channel 25, one can, in taking advantage of the residual plasticity of the extruded material before its solidification, modify the form and even increase or decrease the section of the tube T. It is equally possible to modify the length of the extruded tube T before solidification, for example by applying tension forces on its longitudinal elements 32, 32', particularly by loading them with weights.

The means necessary for solidifying the tube T, which ought to be adapted to the nature of the extruded material, has not been shown in FIGURES 12 and 13 because it is well known.

The machine which has just been described can easily be modified to obtain tubes of lacunar structure exhibiting parallel longitudinal bands differently coloured, and indeed of different widths. It is sufficient to this end to sub-divide the annular distribution chamber 26, as shown in FIG. 30A, in a corresponding number of compartments, each fed from conduits, such as 27 and 28, independently of one another, with the differently coloured materials to be extruded. The variant of the device shown in FIG. 12 has a cross section as shown in FIGS. 29A and 30A which are views taken in planes corresponding to the section lines XXIX—XXIX and XXX—XXX respectively of the embodiment illustrated in FIG. 12.

As the channels 31 with which the die 29 is provided have their transverse section open and the machined surface 23' is brought preferably, when die 29 occupies its upper operative position, into prolongment of the upper wall of the annular channel 25, formed by the piece 24, the material extruded through the annular channel 25 passes as well the channels 31, so that there is no interruption of formation of the linear longitudinal elements 32, 32' during formation of each of the annular transverse elements 33. In other words, in each of the knots of its meshes the tube manufactured by means of the machine shown in FIGURES 12 and 13 exhibits a transverse section of which the area is close to the sum of the areas of the transverse sections of the longitudinal and transverse straight elements which cross at the knot. The formation of the longitudinal elements 32, 32' can on the other hand be interrupted at the formation of each of the transverse elements 33, by appropriate means, formed for example by a ring 36 which moves to obscure the outlets of the transverse channels 31 of the die 29 when this is in the upper position. This auxiliary arrangement enables a tube of uniform thickness to be obtained, even at the knots of the voids.

In the example illustrated, the size of the auxiliary channel 25 is determined by the spacing between the lower edge of the piece 24 and the machine surface 23 of the die 21. This size can be modified either by making the piece 24 movable relative to the die 21 in the direction of the axis 22, or by changing the piece 24 for another, of a different axial length. This arrangement enables one to adjust to the desired value the width of each of the transverse linear elements 33. It would evidently be possible for the piece 24 to be fast with the die 21, the size of the annular channel 25 then being invariable.

By way of a modification the two dies 21 and 29 can be maintained in a permanent relative position such that the outlet of the annular channel 25 is always wholly clear, so that a whole tube can be extruded. The linear elements which are then extruded through the transverse channels such as 31 of the two dies 21 and 29, or of one of them only, form continuous longitudinal grooves on one at least of the opposed faces of the whole tube. Different materials can be used to ensure extrusion of the tube and that of the longitudinal grooves. It is even possible in a general sense, to produce meshed tubes exhibiting longitudinal strips of different substances. In the case where the outlet of the annular channel is always clear, one can also provide means for periodically modifying the size of the outlet of this annular channel, so as to form on at least one of the faces of the extruded whole tube continuous grooves transverse with respect to the continuous parallel slots formed by the transverse channels.

The tubes of lacunar structure, particularly reticulated, made by extrusion by the machine shown in FIGURES 12 and 13, particularly in synthetic material, can be cut longitudinally and can be flattened into a sheet. These two operations can be effected, in the case of a synthetic material which is relatively rigid, before solidifying the material. The tubes themselves can be used for example to form kinds of bags, by closing at least one of their extremities by a known process, such as welding particularly before solidifying the material, or by gluing, clamping, etc.

Figure 14:
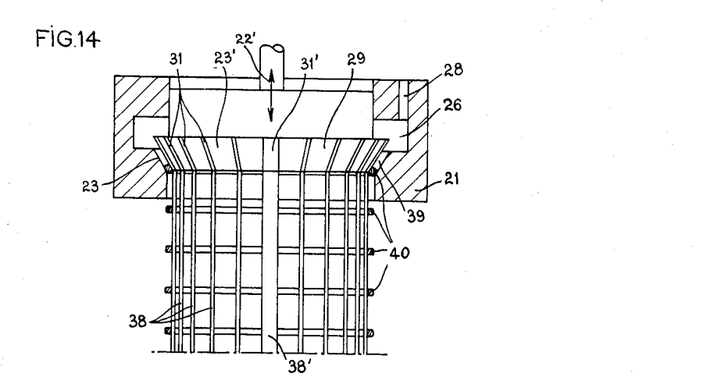
FIGURE 14 is a variant of the machine of FIGURES
12 and 13 in section and taken through a diametric plane.

In the variation shown in section on a diametric plane in FIGURE 14, it is the fixed die 21 which has an annular form, its smooth machined surface 23 having the form of a zone of a counter-revolution. The movable die 29 is on the other hand placed at the centre of the fixed annular die 21, so that its machined surface 23', again in the form of a zone of a cone of revolution, can be brought into sealing contact with the machined surface 23 of the fixed die 21 by displacement in the sense of the arrow 22', that is to say in the direction of the common axis of the two dies 21 and 29. The machined surface 23' of the movable die 29 is cut by channels of open section, notably channels of semi-circular section 31, and a single channel 31', of larger section, for example rectangular. The material is brought, in a physical state appropriate to its extrusion, into the annular distribution chamber 26, by the channel 28. When the die 29 occupies its lowermost extreme position in which its machined surface 23' is in contact with the machined surface 23 of the fixed die 21, the material brought into the distribution chamber 26 is extruded exclusively by way of the channels 31, 31', forming respectively the vertical bars 38 and the larger vertical band 38'. When on the other hand the movable die 29 occupies the position shown in FIGURE 14, in which the two machined surfaces 3 and 3' of the two dies are spaced from one another, so as to provide between them an annular straight space 39, the material brought into the distribution chamber 26 is not only extruded by way of the channels 31, 31', to form the linear vertical elements 38, 38', but it is equally extruded by way of the annular space 39 to form an annular linear element such at 40. The different annular elements such as 40 which are successively formed in the course of each of the periodic openings of the space 39, resulting from oscillation of the movable die 29 in the sense of the arrow 22', join themselves at their points of cross-over with the vertical elements 38, 38' so as to form a tube of reticulated structure, having a circular section. By cutting this tube along the medial longitudinal axis of its band 18' and by developing it, a form of grid body having full edges is obtained. Those two operations can be carried out before solidification of the material.

Figure 15:
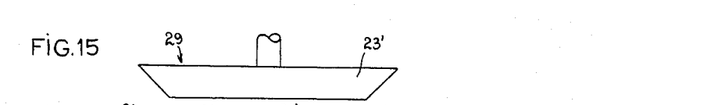
FIGURES 15 to 17 are views of another embodiment
for extruding a tube of lacunar structure of rectangular
section.
Figure 16:
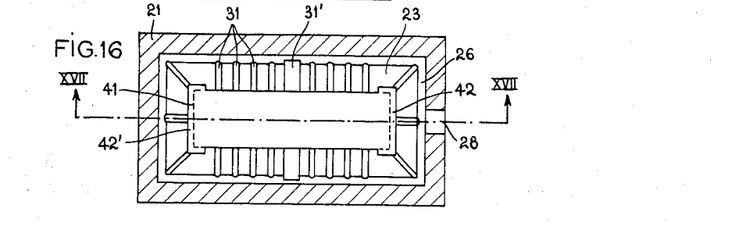
Figure 17:
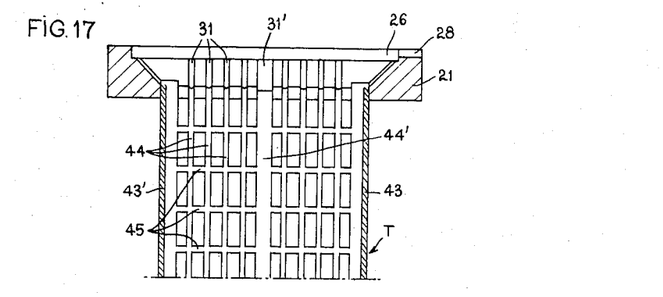

In the embodiment shown in FIGURES 15 to 17, the fixed die 21 has an annular form, but of rectangular contour; it is in its machined surface 23 that the transverse channels 31, 31' are provided differing in their form and dimensions of their transverse sections. The movable die 29 has likewise a rectangular contour, but each channel for transverse extrusion is not formed in its peripheral machined surface 23', which is formed so as to be able to come into sealing contact with machined surface 23 of the die 21 when the die 29 occupies its extreme lower operative position. The material is brought by conduit 28 into an annular channel 26 whence it passes into the extrusion channels 31, 31', as well as into the space existing between the two dies 21 and 29. The rectangle shown in broken line 41 represents, in FIGURE 16, the lower contour of the movable die 29 when its machined surface 23' is in contact with the machined surface 23 of the fixed die 21. It can be seen then that the material is extruded in a continuous manner through the intervals 42, 42', to form the two full walls 43, 43', of the tube T of lacunar structure which is illustrated in FIGURE 17, in section on a longitudinal plane. These two full walls 43, 43' are coupled to one another by two grid walls, of which one only is visible in FIGURE 17. These grid walls are each formed by linear vertical elements 44, 44' which are extruded in continuous fashion respectively by way of channels 31, 31' and by linear horizontal elements 45, which are extruded in the space which is established periodically between the machined surfaces 23, 23' of the two dies 21 and 29. The tube of rectangular section T thus obtained can be split along one of its edges, before solidification; it allows production of conditioning receptacles, particularly of relatively flexible synthetic material, providing at least two grid walls.

Figure 18:
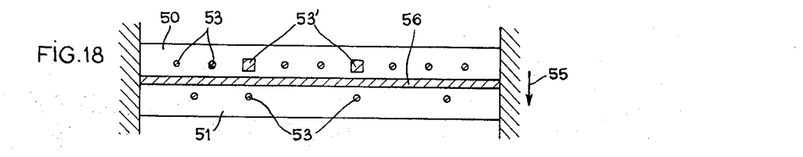
FIGURES 18 and 19 are diagrammatic views illustrat-
ing two different phases of the operation of a machine
according to the invention having two extrusion dies.
Figure 19:
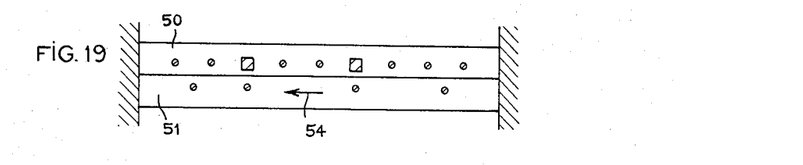
Figure 20:
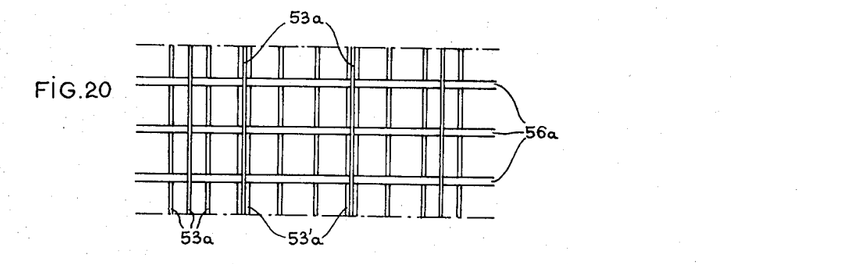
FIGURE 20 is a vertical view of a grid produced by means of the machine of FIGURES 18 and 19.

FIGURES 18 and 19 illustrate schematcally the operation of the most general embodiment of machine according to the invention which comprises two extrusion dies movable relative to one another and of which one at least is provided with parallel channels. In FIGURES 18 and 19, the two dies 50 and 51 shown by way of example are straight and parallel, they could equally be curved, and they are provided with channels 53, 53' parallel with one another, but perpendicular to the direction of extension of the dies, so that they are seen on end in FIGURES 18 and 19. In the example illustrated, the channels with which the dies 50 and 51 are provided have closed transverse sections, which differ at the same time in form and dimension, not only from one die to another but even in one die. The die 50 for example comprises channels of circular section 53, and channels 53' of rectangular section, while the die 51 comprises only channels of circular section 53. Otherwise, the two dies 50 and 51 comprise numbers of different channels, and the channels of one are not located opposite the channels of the other. Finally, the two dies 50 and 51 can be displaced relative to one another, one for example being fixed and the other movable. It is already known to use couples of dies of this kind to make sheets, plates or tubes of reticulated structure, by displacing the two dies 50 and 51 relative to one another in the sense of the arrow 54 in FIGURE 19; that is to say in making the dies 50 and 51 slide while maintaining them in contact with one another, or at least at a constant distance from one another. The present invention proposes on the other hand to make the sheets, plates or tubes of lacunar structure and particularly reticulated by means of a couple of movable dies such as that illustrated in FIGURES 17 and 18, by alternately approaching and withdrawing the dies with respect to one another in the direction of the arrow 55 in FIGURE 18. The process of forming the reticulated structure is as follows: when the two dies 50 and 51 approach to contact with one another as illustrated in FIGURE 19, the material, which is assumed to have been brought in continuous fashion above the two dies 50 and 51, in the direction of their channels 53, 53', is extruded only by way of channels 53, 53', to form thereby linear parallel elements between them, which, in FIGURE 20, have been designated by these same reference numerals followed by the letter a, as the extrusion channels which have formed them. When on the other hand the two dies 50 and 51 have been separated from one another in the sense of the arrow 55 and there exists therefore between them a space 56 of uniform width, as shown in FIGURE 18, the material is extruded through this space 56, forming a single linear element, transverse with respect to the straight parallel elements extruded through the channels 53, 53'. In the example illustrated, where these channels 53, 53' have closed sections, the junction between the linear elements 53a, 53'a and the linear elements 56a which have formed successively, takes place clearly after the material leaves the outlet, still in a pasty condition, from the channels 53 and 53', that is to say below the dies 50 and 51. In the example illustrated in FIGURES 18 and 19; by way of variation, the channels 53, 53' of dies 50 and 51 can on the other hand open to the outside of the corresponding die, that is to say in the space 26 existing between the dies when they are spaced from one another (FIGURE 18), the channels being closed by the wall of the other die when they touch (FIGURE 19); in this case, the junction between the linear elements 53a, 53'a, and the linear elements 56a occur precisely in the space 56 between the two dies 50, 51. In the example which has just been described, the linear elements 53a, 53'a are to one side or the other of the linear elements 56a, according to whether they have been formed by the die 50 or the die 51. They can be obtained on the same side of the linear elements 56a by removing the extrusion channels of the other die. Finally it is possible to obtain a sheet or plate of reticulated structure exhibiting uniform thickness, by providing means for obstructing the outlets of the channels of the extrusion dies 50, 51 when these are spaced from one another (FIGURE 18).

One method of operation of the machine which has just been described with reference to FIGURES 18 and 19 consists in keeping its two dies 50 and 51 permanently at a constant distance from one another, so as to assure simultaneous permanent extrusion of the material through the channels 53, 53' of the two dies, as well as by the space 56 (FIGURE 18); the product so produced consists of one sheet or plate of uniform thickness, exhibiting on at least one of its two faces continuous parallel ribs, analogous to reinforcing ribs. By periodically modifying the spacing of the two dies, one can also form continuous ribs, transverse relative to the former.

Figure 21:
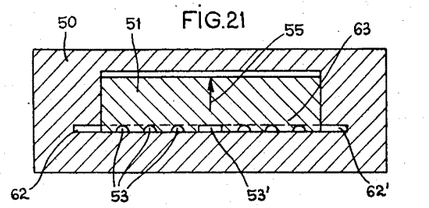
FIGURES 21 and 23 are cross section views of two embodiments of a machine according to FIGURES 18 and 19.
Figure 23:
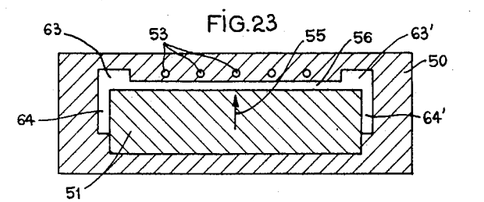

In FIGURES 21 and 23 there has been shown a section in a plane perpendicular to the direction of flow of the material to be extruded, two particular embodiments of the machine whose operation has been described above with reference to FIGURES 18 and 19. The illustration has been limited in each case to the two dies 50 and 51, which are mounted so as to slide with respect to one another in a direction perpendicular to their extrusion channels 53, 53', which are indicated by the arrow 55. More precisely the die 50 exhibits a hollow interior, in which the die 51 is located so as to be displaceable alternatively between two positions, one in which two dies 50, 51 are in contact by their neighboring faces of their extrusion channels 53, 53' (FIGURE 21), and the other in which the faces of the two dies 50 and 51 are spaced from one another so as to provide a space 56 between them (FIGURE 23). In the embodiment of FIGURE 1, only the interior movable die 51 comprises extrusion channels, open on the face of the die 51 which is directed towards the die 50; there exists two spaces 53, 53', different in form and dimensions of their transverse sections; in the embodiment of FIGURE 23 on the contrary, only the fixed die 50 comprises extrusion channels 53, of closed transverse section and all identical with one another.

Figure 22:
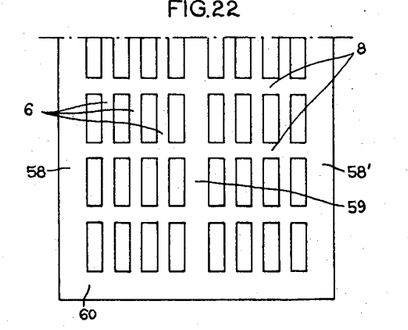
FIGURES 22 and 24 are views of a grid frame and a conditioning receptacle of synthetic material, which can be produced respectively by means of the machines of FIGURES 21 and 23.

There will now be briefly described the production of the grid body of FIGURE 22 by means of two dies of FIGURE 21. The two plane vertical edges 58, 58' of the body of FIGURE 22 are formed by continuous extrusion of the material through the interior 62, 62' of the die 50 of FIGURE 21, which are never obstructed by the die 51 in the course of the displacements of that die. The vertical bars 6 are formed by extrusion of the material through the channels 53 of the die 51. The medial strip 59 is also formed by extrusion of the material through channel 53' of the disc 51, the horizontal bars 8 coupling together the edges 58, 58' of the body and the vertical bars 6, as well as the medial strip 59 are formed by extrusion of the material through the interval existing between the two dies 50 and 51 when the face of the die 51 on which the channels 53, 53' open is brought to a register with the plane the position of which is indicated by the broken line 63 in FIGURE 21; means can be provided to obstruct the outlets of the extrusion channels 53, 53' so as to interrupt the formation of the vertical bars 6 and of the medial strip 59 during the formation of the horizontal bars 8. The fusion of the vertical elements 58, 58', 59 of the one part and the horizontal elements 8 and 60—this last forming the lower full border of the body—occurs in the space between the two dies 50 and 51 by way of the open parts of the extrusion channels 53, 53'.

Figure 24:
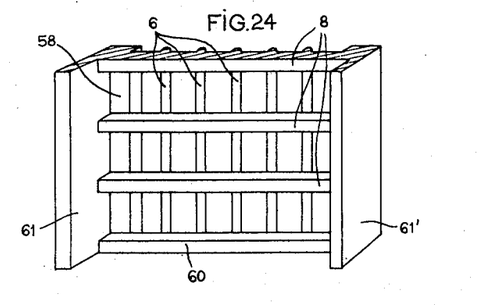

In the case of the conditioning receptacle in plastic material, having a grid base, which is shown in FIGURE 24, the full sides 61, 61' are formed by continuous extrusion of material by way of hollows 64, 64' of the fixed die 50, which are never obstructed by the die 51. These hollows 63, 63' also allow formation by continuous extrusion of the full edges 58, 58' of the grid base of the receptacle. The horizontal strips 8 of this grid base are formed by extrusion of material by way of the space 56 existing between the two dies 50 and 51 when they occupy the respective positions illustrated in FIGURE 23. The vertical bars 6 of the grid base are formed by the continuous extrusion of the material through the channels of closed transverse section 53 of the fixed die 50, the outlets of these channels being kept open permanently; also the junction between the vertical bars 6 of the one part, and the horizontal elements of the base of the receptacle 8 and 60 on the other hand, are produced below the dies 50 and 51, that is to say outside the outlets of the extrusion channels 53.

Figure 25:
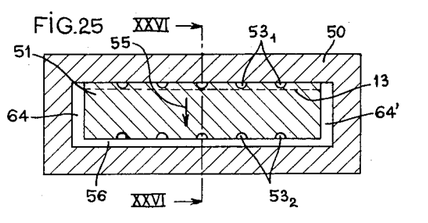
FIGURES 25 and 26 are views respectively in cross section and a section taken on the line XXVI—XXVI of FIGURE 25 of another embodiment of the machine of FIGURES 18 and 19.
Figure 26:
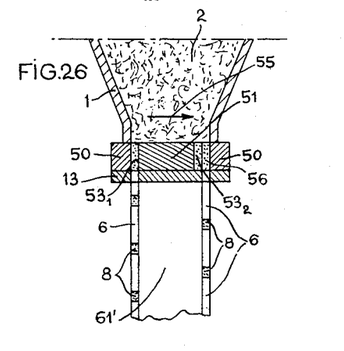

In the variation of FIGURES 25 and 26 the die 51 exhibits open extrusion channels 53₁, 53₂ on its two faces which co-operate with the corresponding faces of the hollow interior of the die 50 in the course of displacements in the sense of the arrow 5. Then, one can obtain a type of tube having a rectangular section, exhibiting two full opposed sides 61, 61', extruded in a continuous fashion through the spaces of constant size 64, 64' as well as two other grid sides, which have been produced in the same fashion as the body of FIGURES 22, their horizontal elements 8 only being offset in height as shown in FIGURE 26; a plate 13 split into a rectangular ring is located beneath the dies 50 and 51 (FIGURE 26) to control the width of the extruded tube; in splitting this along one of its edges, one can achieve a conditioning element, particularly in flexible synthetic material.

Figure 27:
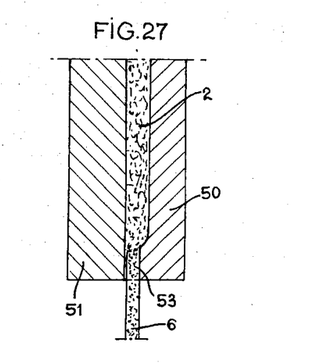
FIGURES 27 and 28 are fragmentary section views illustrating two different phases in the operation of another embodiment of a machine according to the invention, and having two extrusion dies.
Figure 28:
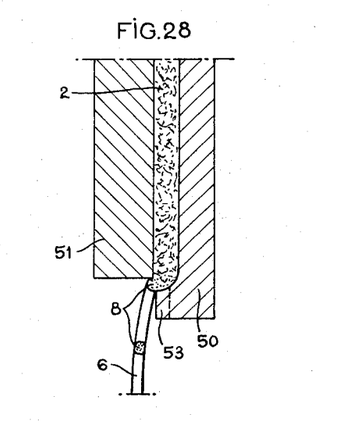

In the embodiment shown in FIGURES 27 and 28 the die 50 is only provided with extrusion channels 53 parallel to the direction of relative movement of the two dies 50 and 51 and to the direction of arrival of the material to be extruded; in the relative position shown in FIGURE 27 the material is extruded only through the channels 53 to form thereby parallel linear elements (vertical) 6; in the relative position illustrated in FIGURE 28, the material is extruded through the unmasked slot between the two dies 50, 51 to form a single linear element (horizontal) 8. It is to be understood, that appropriate means, not shown, can be adapted to interrupt the formation of the parallel elements 6.

What is claimed is:

1. Machine for continuous production of a generally tubular reticulated structure, formed by parallel threads of a solidifiable material extending generally longitudinally of said structure and threads of material extending generally circumferentially of said structure to form substantially rectangular meshes, comprising in combination, an extruder for extruding a generally tubular structure having a die comprising a substantially rectangular, annular, extrusion orifice having two short sides and two longer sides, a system of two combs assembled with one another, each comb having a plurality of teeth, each tooth end of one comb being opposite a respective tooth end of the other comb with a mutual spacing between tooth ends at least equal to the width of the orifice of the die, said system of combs being mounted adjacent to the orifice of said die so as to be displaceable relative to said die between two operative position, in which the teeth of either comb partially obstruct one of the longer sides of the orifice while the other longer side of the orifice is completely unobstructed, and means for alternately displacing said system of combs to said operative positions, through intermediate positions where both of said longer sides of the orifice of the die are partially obstructed by the teeth of both of said combs.

2. A machine for producing articles of a solidifiable material, sand having at least in part a net-like structure, comprising in combination, an extrusion die having a narrow annular extrusion outlet, a comb-like member having a plurality of spaced teeth and arranged to be displaceable in relation to the outlet of said die between a first position in which the teeth of said comb-like member project across the narrow elongated outlet of said die, thereby obstructing it at a plurality of areas spaced along the elongated outlet, and a second position in which the teeth of the comb-like member are outside of said die outlet and said outlet is unobstructed, and means for intermittently displacing the comb-like member at successive predetermined times from its first position to its second position, and back to its first position.

3. A machine as claimed in claim 2, for manufacturing said articles with a plastic material, comprising heating means to keep at least the die at a selected temperature.

4. A machine for producing from a solidifiable material, articles having at least in part a net-like structure, comprising in combination, an extruder including an extrusion die having dip-forming walls defining a narrow outlet, said walls being disposed substantially parallel to each other and having different extents in the direction of extrusion, a comb-like member comprising a plurality of teeth having a length substantially equal to the width of said outlet of the die and having tooth-spaces between successive teeth, said comb-like member being arranged to be displaceable in relation to said outlet of the die between a first position in which its teeth project across said outlet with their tooth-ends in contact with the lip-forming wall of larger extent, thereby obstructing the outlet at a plurality of areas spaced along the outlet and a second position in which the teeth of the comb-like member are outside of the outlet with their tooth-ends substantially flush with the lip-forming wall of lesser extent, and means for periodically displacing the comb-like member at successive predetermined times from its first position, in which a plurality of separate parallel strands of material are simultaneously extruded through the tooth-spaces of the comb-like member, to its second position in which a single strand of material is extruded transversely to said parallel strands.

5. An extrusion machine according to claim 4, further comprising means to obstruct the tooth-spaces of the comb-like member when its teeth are outside of said outlet, whereby the extrusion of said plurality of parallel strands is prevented when each transversely extending strand is extruded.

6. A machine for producing with a solidifiable material, a generally tubular structure having at least in part a net-like structure, comprising in combination, an extruder including a die having two relatively movable coaxially disposed members operable to a position defining therebetween an annular extrusion outlet, said members having contacting surfaces, one of said die members having a plurality of teeth extending in an axial direction thereof, said one member being axially displaceable in relation to the other die member between a first position in which the teeth of said one member engage the other member thereby defining at the contacting surfaces a plurality of angularly spaced extrusion areas and a second position in which the teeth of said one member are axially spaced from said other member thereby defining said die outlet, and means for displacing said one member periodically at predetermined intervals from its first position to its second position and back to its first position.

7. A machine for manufacturing with a plastic material a tubular article having at least in part a net-like structure, comprising, in combination, an elongated hollow body, said hollow body having an upper part provided with a channel disposed substantially vertically and open at its upper end and closed at its lower end, said hollow body having a lower part provided with an annular chamber, said lower part having a peripheral wall and in this wall a narrow annular slot in communication with said annular chamber, said body having ducts establishing communication between the closed lower end of said vertical channel and said annular chamber, means for bringing the plastic material to be extruded in a liquid state to the upper open end of said vertical channel, a sleeve mounted about the hollow body and vertically movable relative to said hollow body, said sleeve having a lower end comprising a plurality of teeth, an electric resistance winding disposed for heating the plastic at least in the lower part of said vertical channel, and means for imparting to said sleeve relatively to the hollow body a reciprocatory movement between a lower position, in which the teeth of said sleeve project across the narrow annular slot on the peripheral wall of the lower part of the hollow body, and an upper position in which the teeth of said sleeve are outside of said annular slot.

8. A machine as claimed in claim 7, in which said body comprises two walls defining said slot and having different extents in a downward axial direction, and the teeth of the sleeve being disposed to contact with the wall of longer axial extent on said body when said sleeve is in said lower position, and substantially flush with the other wall of lesser axial extent when said sleeve is in said upper position.

9. A machine according to claim 7, including means dividing said vertical channel into a number of subchannels and said chamber into subchannels in communication with respective subchannels, whereby plastic material of different colors can be delivered to said subchannels for extruding a varicolored tubular article.

10. An extrusion machine for manufacturing articles from a solidifiable material and having at least in part a net-like structure comprising, extrusion die means for continuously extruding a plurality of elongated generally parallel strands and for extruding other strands as continuations of the first-mentioned strands and substantially normal thereto, said extrusion die means comprising coaxial, orifice-defining means having coaxial, coactive surfaces jointly defining in a first operative position a discontinuous extrusion orifice having obstructed areas and spaced, unobstructed areas contiguous with said obstructed areas for extruding said first-mentioned strands through said unobstructed areas, said coactive surfaces being axially movable relatively one to the other to a second operative position with said surfaces spaced and jointly defining said extrusion orifice as a continuous and unobstructed orifice for extruding said other strands therethrough, and means on said orifice-defining means to move said surfaces to said operative positions alternately.

References Cited by the Examiner

UNITED STATES PATENTS

| 2,919,467 | 1/1960 | Mercer. | |
| 3,002,615 | 10/1961 | Lemelson | 18—12 X |
| 3,012,275 | 12/1961 | Nalle | 18—12 X |
| 3,019,483 | 2/1962 | Schultheiss | 18—12 X |
| 3,029,174 | 4/1962 | Schultheiss | 18—12 X |
| 3,038,205 | 6/1962 | Plummor | 264—177 |
| 3,060,551 | 10/1962 | Bogaty et al. | 161—70 |
| 3,067,084 | 12/1962 | Nalle | 18—14 X |
| 3,067,468 | 12/1962 | Kelley et al. | 264—177 |
| 3,070,840 | 1/1963 | Mercor | 18—12 |
| 3,096,563 | 7/1963 | Messinger | 161—70 |
| 3,112,526 | 12/1963 | Martin | 18—12 |

FOREIGN PATENTS

| 368,393 | 10/1906 | France. |
| 1,109,131 | 6/1961 | Germany. |

J. SPENCER OVERHOLSER, *Primary Examiner.*

ROBERT F. WHITE, ALEXANDER H. BRODMERKEL, WILLIAM J. STEPHENSON,
*Examiners.*